United States Patent
Huang

[19]

[11] Patent Number: 6,131,941
[45] Date of Patent: Oct. 17, 2000

[54] COLLAPSIBLE TROLLEY FOR DISPLAYING AND CARRYING THINGS

[76] Inventor: Chi-Tzung Huang, No. 50-5, Ta-Chueh Wei, Ta-Chueh Village, Shui-Shang Hsiang, Chia-Yi Hsien, Taiwae, Taiwan

[21] Appl. No.: 09/103,301

[22] Filed: Jun. 23, 1998

[51] Int. Cl.[7] ................................................ B62B 3/02
[52] U.S. Cl. ...................................... 280/651; 280/47.35
[58] Field of Search ............................. 280/30, 638, 35, 280/639, 641, 643, 42, 651, 47.35, 47.34, 79.3; 248/346.3; 108/115

[56] References Cited

U.S. PATENT DOCUMENTS

| | | | |
|---|---|---|---|
| 1,563,057 | 11/1925 | Williams | 280/79.3 |
| 3,102,648 | 9/1963 | Huches | 280/47.34 |
| 3,810,648 | 5/1974 | Hallenius | 280/651 |
| 4,323,133 | 4/1982 | Williams | 280/42 |
| 4,349,213 | 9/1982 | Hirsch | 280/47.35 |
| 4,997,151 | 3/1991 | Pai | 108/115 |
| 5,464,237 | 11/1995 | Saporiti | 280/30 |
| 5,605,344 | 2/1997 | Insalaco et al. | 280/47.35 |
| 5,664,799 | 9/1997 | Cavanaugh | 280/639 |
| 5,829,765 | 11/1998 | Snider | 280/47.34 |

FOREIGN PATENT DOCUMENTS

| | | | |
|---|---|---|---|
| 198136 | 6/1958 | Austria | 280/639 |
| 4200116 | 7/1993 | Germany | 280/651 |
| 444684 | 2/1968 | Switzerland | 280/651 |

*Primary Examiner*—J. J. Swann
*Assistant Examiner*—F. B. Vanaman
*Attorney, Agent, or Firm*—Rosenberg, Klein & Lee

[57] ABSTRACT

The collapsible trolley having one or two flat boards for displaying things, a plurality of casters and a side frame which consists of four frame sections: two non-collapsible sections and two collapsible sections located at the opposite ends of the trolley. The four frame sections are pivotally connected with a plurality of rods so as to allow two collapsible frame sections to be folded inward. The flat boards which fit properly to the interior of the side frame, help keep the trolley sturdy when the side frame is fully extended for use. When the trolley is not in use, the flat boards are lifted from their normal positions and allowed to stand against the non-collapsible frame sections while the two collapsible frame sections are pushed inward.

7 Claims, 5 Drawing Sheets

COLLAPSIBLE TROLLEY FOR DISPLAYING AND CARRYING THINGS

BACKGROUND OF THE INVENTION

The present invention is related to a trolley, or a cart with casters, for carrying and displaying things.

A traditional displaying rack may consist of a flat board supported by legs made from rods. This simple rack is likely to fall to the ground when it is accidentally pushed.

Another common displaying device is simply a cart with wheels, which cannot be folded into a small size for the convenience of storage and transportation when it is not in use.

It is advantageous to provide a displaying rack with casters, which is sturdy and collapsible so that it can be folded into a small size when not in use.

SUMMARY OF THE INVENTION

The collapsible trolley, according to the present invention, consists of two flat boards, a plurality of casters and a side frame. One of the flat board is used as a base, or the bottom shelf, of the trolley while the other is used as an upper shelf The side frame consists of four frame sections: two non-collapsible sections and two collapsible sections located on the opposite sides of the trolley. The four frame sections are pivotally connected with a plurality of rods so as to allow two collapsible frame sections to be folded when pushed inward. The flat boards, which fit properly to the interior dimensions of the side frame, help keep the trolley sturdy when the side frame is fully extended for use. When the trolley is not in use, the flat boards are lifted from their normal positions and allowed to stand against the non-collapsible frame sections while the two collapsible frame sections are pushed inward.

DETAILED DESCRIPTION OF THE INVENTION

Figure 1:
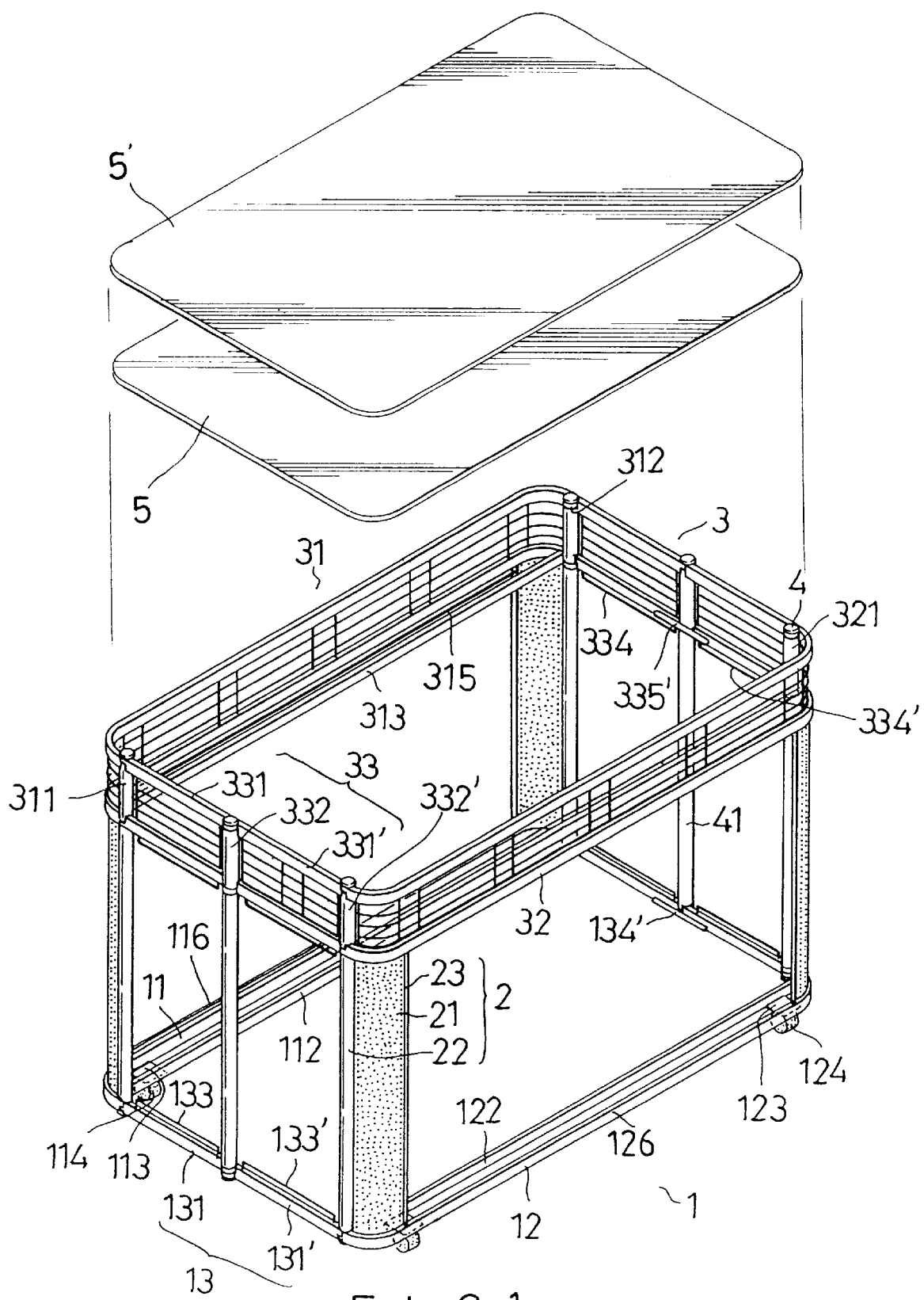
FIG. 1 is a perspective view of the collapsible trolley, according to the present invention.
Figure 2:
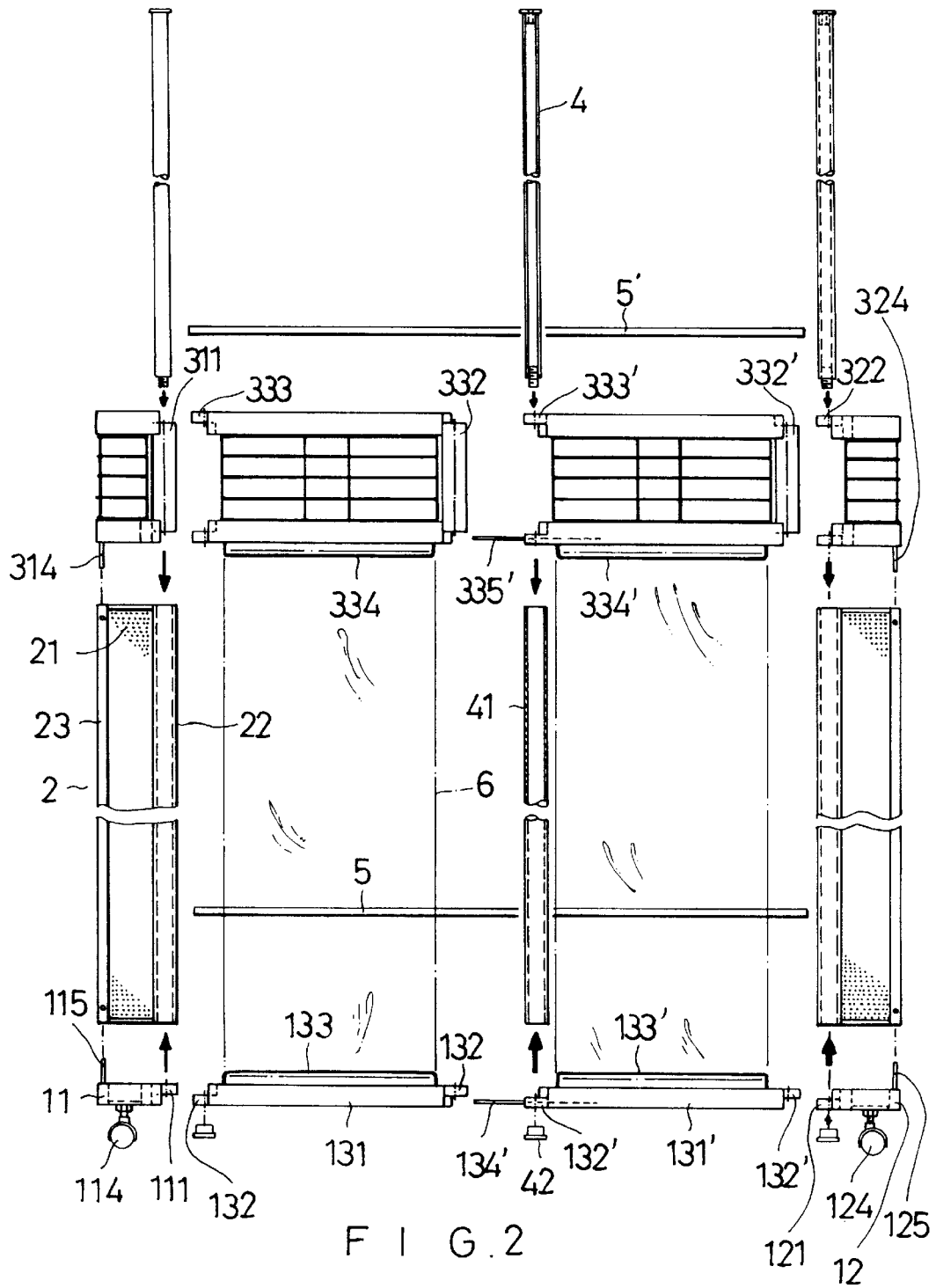
FIG. 2 is an exploded view of the side of the collapsible trolley.
Figure 4:
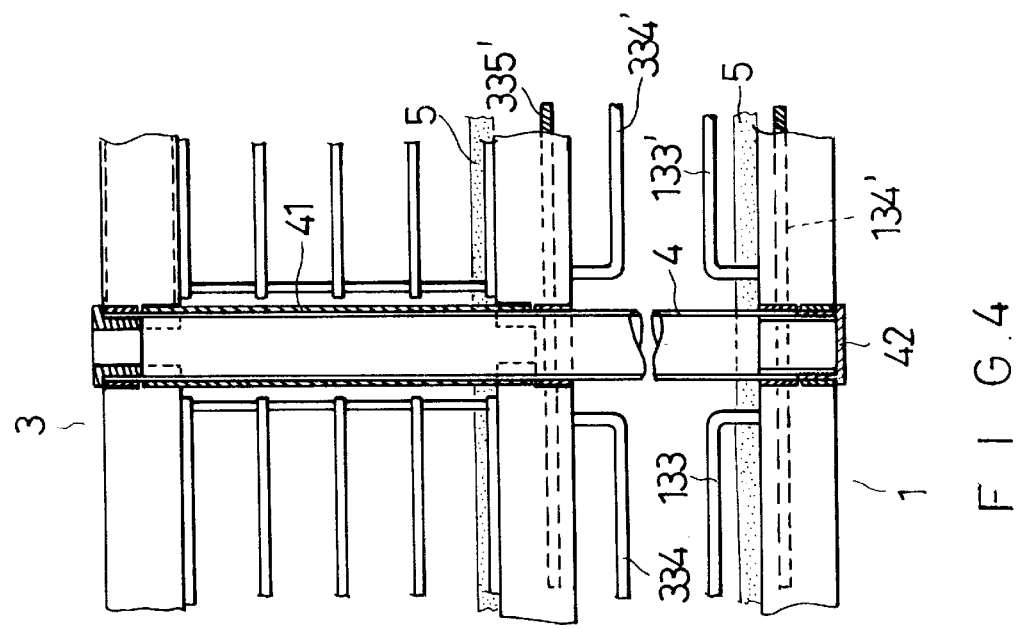
FIG. 4 is a fragmentary section view of the collapsible trolley.

Referring to FIG. 1 and FIG. 2, the collapsible trolley, according to the present invention, includes two flat boards 5 and 5', two front casters 114 and two rear casters 124, and a side frame. The side frame includes an upper frame 3, a lower frame 1, four vertical supports 2, a plurality of axial rods 4 and a side covers 6 which are used to enclose the side frame.

Figure 3:
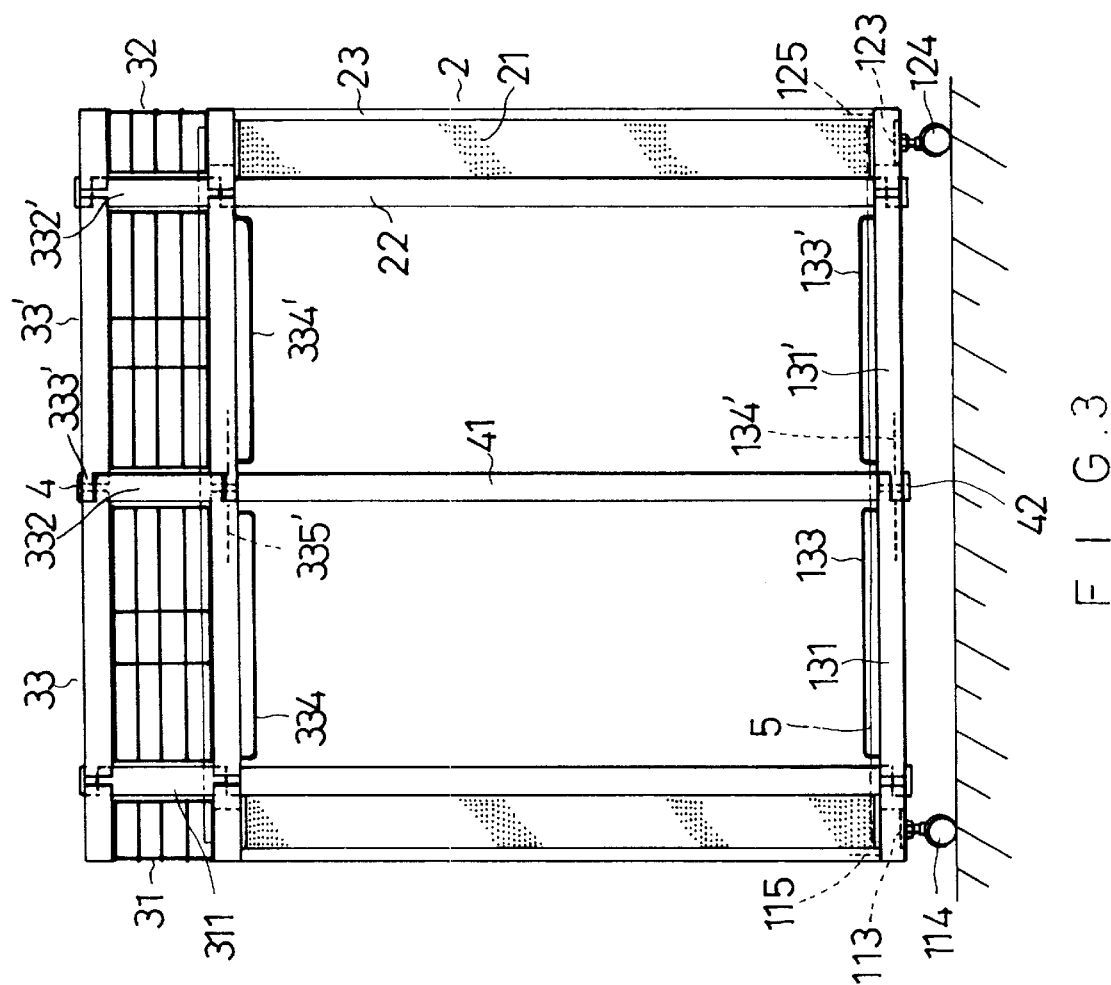
FIG. 3 is a side view of the collapsible trolley.
Figure 5:
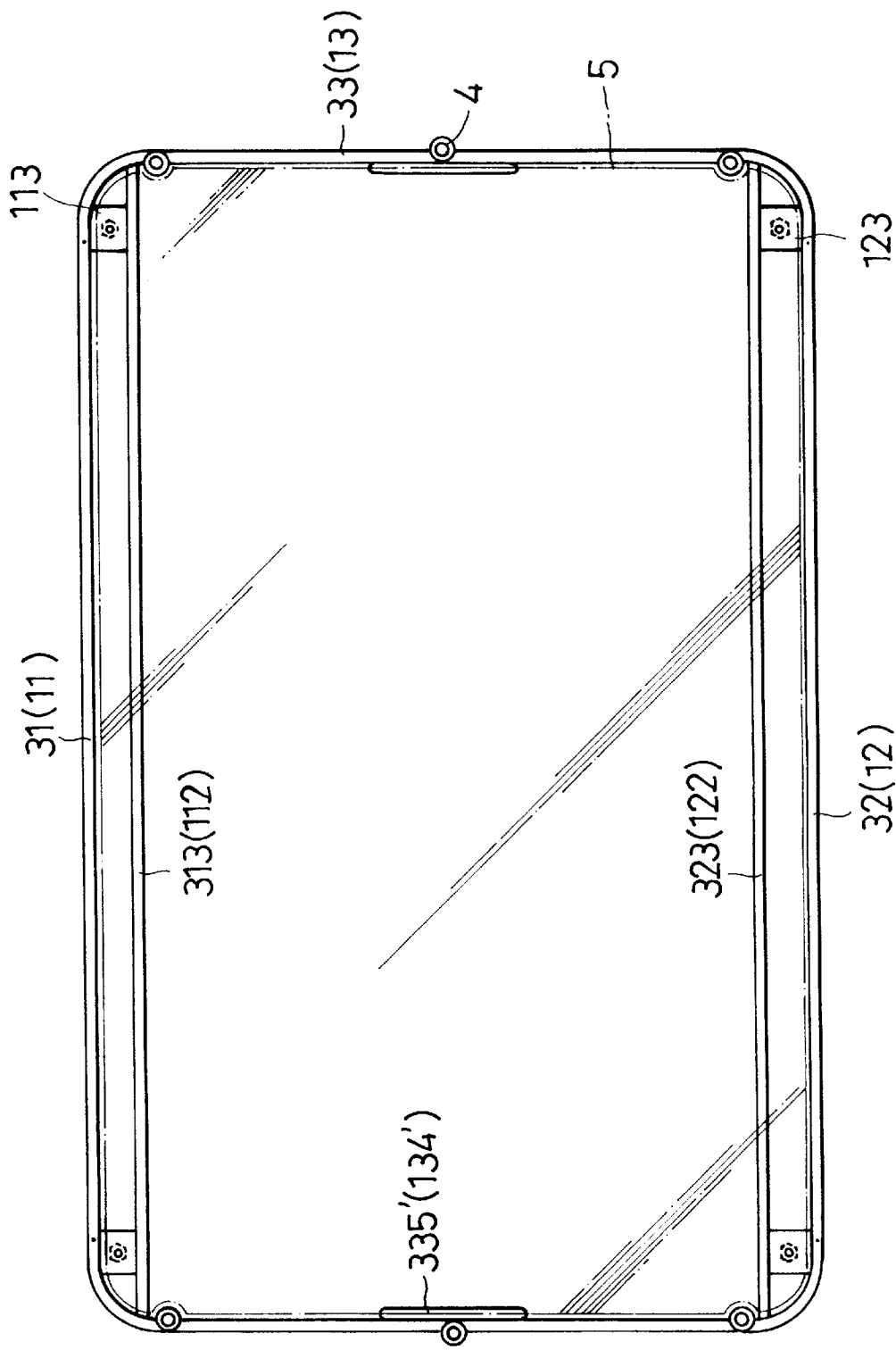
FIG. 5 is the top view of the collapsible trolley when it is fully extended.

The lower frame 1 consists of a front frame part 11, a rear frame part 12 and two foldable side parts 13. The front frame part 11 has two fixing bodies 111, one on the upper part of one end and another on the lower part of the other end. The rear frame part 12 has two fixing bodies 121, one on the upper part of one end and another on the lower part of the other end. The opposite ends of the front frame part 11 are connected with a horizontal bar 112 on the inside, by means of connecting members 113, and a fixing bar 116 on the outside. Similarly, the opposite ends of the rear frame part 12 are connected with a horizontal bar 122 on the inside, by means of connecting members 123, and a fixing bar 126 on the outside. The connecting members 113 and 123, which are clearly shown in FIG. 3 and FIG. 5, are used for mounting casters 114 and 124, respectively. The front frame part 11 has, on each end thereof, an upward protruding pin 115. Similarly, the rear frame part 12 has two upward protruding pins 125. Each side part 13 consists of a pipe support 131 and a pipe support 131'. The pipe support 131 has two holed connecting bodies 132, one on the upper part of one end and another on the lower part of the other end of the pipe support 131. The pipe support 131' has two similar holed connecting bodies 132'. The pipe supports 131 and 131' have, respectively, a fixing bar 133 and 133'. The pipe support 131' further comprises a protrusion 134'.

Each vertical support 2 has a plurality of pinholes for decorative purposes. The vertical support 2 further comprises two pipe-shape parts 22 and 23 on its two ends, for connecting the holed connecting pieces 132 and 132' from the outer end of the foldable side parts 13.

The upper frame 3 consists of a front frame part 31, a rear frame part 32 and two side sections 33. The front frame part 31 and the rear frame part 32 have holed joining pipes 311 and 321, respectively, on one end, and holed joining pipes 312 and 322, respectively, on the other end. Furthermore, the upper frame 3 has a horizontal bar 313 for connecting the two ends of the front frame part 31, and a horizontal bar 323 for connecting the two ends of the rear frame part 32. The front frame part 31 has, on each end thereof, a downward protruding pin 314. Similarly, the rear frame part 32 has two downward protruding pins 324. The front frame part 31 further has a fixing bar 315.

Each side section 33 of the upper frame 3 has side supports 331 and 331'. Each side support 331 is provided with a vertical tube 332 on one end and two holed connecting parts 333 on the other end. Similarly, each side support 331' is provided with a vertical tube 332' on one end and two holed connecting parts 333' on the other end. Moreover, the side supports 331 and 331' have fixing rods 334 and 334' on the lower sides thereof, respectively. The side support 331' has a protrusion 335' on the inner side thereof.

When all the components are put together, as shown in FIG. 2 to FIG. 5, the lower frame 1 is connected to the vertical supports 2 by engaging the lower end of the pipe shape parts 23 to the upward protruding pins 115 of the front frame part 11 and the upward protruding pins 125 of the rear frame part 12. The upper frame 3 is connected to the vertical supports 2 by engaging the upper end of the pipe shape parts 23 to the downward protruding pins 314 of the front frame part 31 and the downward protruding pins 324 of the rear frame part 32.

The fixing bodies 111 of the front frame part 11, the pipe shape parts 22 of the vertical support 2, the holed connecting parts 333 of the side support 331, and the holed joining pipes 311 of the front frame part 31 are connected together by the insertion of axial rods 4 to allow the pivotal movement of the pipe supports 131 and the pivotal movement of the side supports 331. Similarly, the fixing bodies 121 of the rear frame part 12, the pipe shape parts 22 of a respective vertical support 2, the joining pipes 322 of the rear frame part 32, and the vertical tube 332' of the side support 331' are connected together by the insertion of axial rods 4 to allow the pivotal movement of the pipe support 131' and the pivotal movement of side support 331'. Furthermore, each of the pipe supports 131 of the lower frame 1 is pivotally connected to a respective pipe support 131', and each of the side support 331 is pivotally connected to a respective side support 331' by means of a tube 41 and an axial rod 4.

Preferably, each of the holed connecting bodies 132, 132' is plugged with an end-button 42. The board 5 is held in position by horizontal bars 313, 323 while the board 5' is held in position by horizontal bars 112, 122. The side covers 6 have hooks and holes and are placed around the fixing bars 133 and the fixing rods 334, and secured in position with hooks being engaged in holes.

Figure 6:
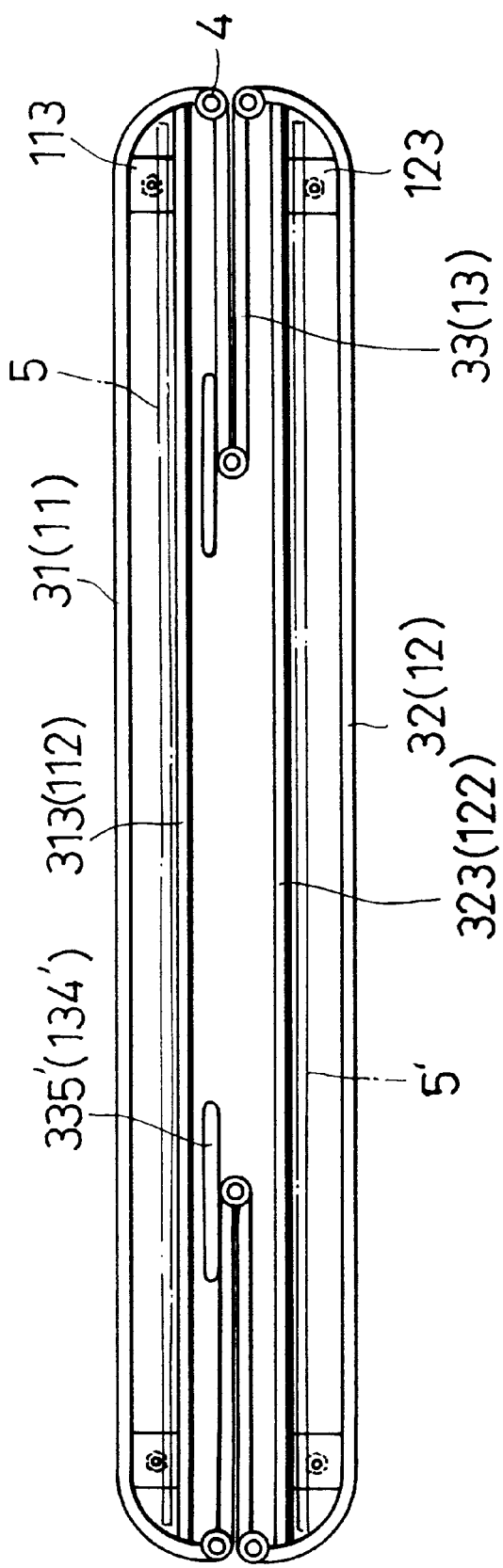
FIG. 6 is the top view of the collapsible trolley when it is in the collapsed form.

When the trolley is not in use, it may be folded up to save space. Referring to FIG. 6, the boards 5 and 5' are placed in a vertical position against the sides of the trolley, with the support of connecting members 113 and 123. The side sections 33 and the foldable side parts 13 are then pushed inward at the vertical tubes 332 and the holed connecting bodies 132. When the trolley is expanded, the vertical tubes 332 and the holed connecting bodies 132 are pushed outward until the side sections 33 and the foldable side parts 13 are hindered by protrusions 335' and 134', respectively, so as to prevent the trolley from being overextended.

While the preferred embodiment of the present invention has been described, it will be recognized and understood that various modifications may be made therein without departing from the scope of the present invention as set forth in the appended claims.

What is claimed is:

1. A collapsible trolley for supporting and displaying articles comprising:

(a) a first frame including:
      (1) longitudinally opposed front and rear first frame parts, each of said first frame parts having a joining pipe portion formed at opposing ends thereof, each said joining pipe portion having a bore defined therethrough; and,
      (2) a pair of side sections each pivotally coupled to and extending between said front and rear first frame parts, said side sections each including at least a pair of side supports pivotally coupled one to the other at an intermediate coupling point, each said side support having a vertical tube portion and a first connecting portion respectively formed at opposing ends thereof, said tube portion having a bore defined therethrough, said first connecting portion having a through hole formed therein;

(b) a second frame vertically offset from said first frame, said second frame including:
      (1) longitudinally opposed front and rear second frame parts, each of said second frame parts having a fixing body portion formed at opposing ends thereof, each said fixing body portion having a through hole formed therein; and,
      (2) a pair of side parts pivotally coupled to and extending between said front and rear second frame parts, said side parts each including at least a pair of pipe supports pivotally coupled one to the other at an intermediate coupling point, each said pipe support having a second connecting portion formed at opposing ends thereof, said second connecting portion having a through hole formed therein;

(c) a plurality of vertical supports extending between said first and second frames, said vertical supports each including at least one substantially tubular pipe part;

(d) at least a first axial rod extending coaxially between said intermediate coupling points of at least one of said first frame side sections and at least one of said second frame side parts; and, (e) at least a second axial rod coaxially coupling respective preselected portions of said first frame, said second frame, and at least one said vertical support.

2. A collapsible trolley for supporting and displaying articles as recited in claim 1 comprising a plurality of said second axial rods, each of at least a pair of said second axial rods passing coaxially through one said joining pipe portion of said front first frame part, one said first connecting portion of said side support, one said vertical support pipe part, one said fixing body portion of said front second frame part, and one said second connecting portion of said pipe support.

3. A collapsible trolley for supporting and displaying articles as recited in claim 2 comprising a further plurality of said second axial rods, each of at least a pair of said second axial rods passing coaxially through one said joining pipe portion of said rear first frame part, one said first connecting portion of said side support, one said vertical support pipe part, one said fixing body portion of said rear second frame part, and one said second connecting portion of said pipe support.

4. A collapsible trolley for supporting and displaying articles as recited in claim 3 comprising a plurality of said first axial rods, each of at least a pair of said first axial rods passing coaxially through said first connecting portion of one said side support, said vertical tube portion of another said side support, and one said second connecting portion of each of an adjacent pair of said pipe supports.

5. A collapsible trolley for supporting and displaying articles as recited in claim 1 wherein at least one of said side sections of said first frame further includes a protrusion member extending from at least a first one of said side supports, said protrusion member being adapted to engage a second one of said side supports for limiting the displacement thereof relative to said first one of said side supports.

6. A collapsible trolley for supporting and displaying articles as recited in claim 1 wherein at least one of said side parts of said second frame further includes a protrusion member extending from at least a first one of said pipe supports, said protrusion member being adapted to engage a second one of said pipe supports for limiting the displacement thereof relative to said first one of said pipe supports.

7. A collapsible trolley for supporting and displaying articles as recited in claim 1 further comprising a board member releasably coupled to at least one of said first and second frames for supporting and displaying an article thereon.

* * * * *